(12) United States Patent
Zhang

(10) Patent No.: US 11,620,473 B1
(45) Date of Patent: Apr. 4, 2023

(54) PRE-PROCESSING RAW DATA IN USER NETWORKS TO CREATE TRAINING DATA FOR SERVICE PROVIDER NETWORKS

(71) Applicant: Amazon Technologies, Inc., Seattle, WA (US)

(72) Inventor: Jiangtao Zhang, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 17/111,229

(22) Filed: Dec. 3, 2020

(51) Int. Cl.
*G06K 9/62* (2022.01)
*G06N 20/00* (2019.01)

(52) U.S. Cl.
CPC ......... *G06K 9/6256* (2013.01); *G06K 9/6232* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,373,218 B1 * | 8/2019 | Jenkins | G06Q 30/06 |
| 2021/0081377 A1 * | 3/2021 | Polleri | H04L 9/088 |
| 2021/0081819 A1 * | 3/2021 | Polleri | G06F 16/252 |

* cited by examiner

*Primary Examiner* — Dov Popovici
(74) *Attorney, Agent, or Firm* — Lee & Hayes, P.C.

(57) ABSTRACT

Techniques for a service provider network to provide users with software components that pre-process raw data stored in user computing networks to generate training data that is usable by artificial-intelligence (AI) services. The AI services may utilize models to provide various functionality to users, and the users may desire to train the models with data sets that are specific to their data sets. The service provider network can develop software components that are configured to process raw data into training data for various AI services. The software components can be provided to the user computing networks and executed locally, rather than the raw data having to being moved from the user computing network and to the service provider network. The training data can then be sent to the service provider network and used by the AI services to train ML models for use by the user.

20 Claims, 11 Drawing Sheets

PRE-PROCESSING RAW DATA IN USER NETWORKS TO CREATE TRAINING DATA FOR SERVICE PROVIDER NETWORKS

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, application-hosting services, and so forth. Additionally, service providers offer different types of artificial-intelligence (AI) services that users can harness such that the large amounts of computing resources in service provider networks can be used to perform intellectual tasks on behalf of the users. These AI services can range from automated-text analytic services, language-translation services, image and/or video analysis services, and so forth. AI describes computerized systems that can perform tasks typically considered to require human intelligence. Machine learning (ML) is a field of computer science that gives computers the ability to learn without being explicitly programmed, for example enabling artificial intelligence systems to learn complex tasks or adapt to changing environments.

Service providers often use models, such as ML, to help provide the functionality of the various AI services (e.g., forecasting, predictions, object recognition). These ML models can be created using deep learning technologies that use large amounts of training data to increase the accuracy and performance of the AI services. Thus, users are able to enroll for use of AI services that are established and ready for use rather than having to create or train ML models themselves. However, some users may have unique data sets that differ from the training data such that the ML models that process these data sets might provide different output than expected by the users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
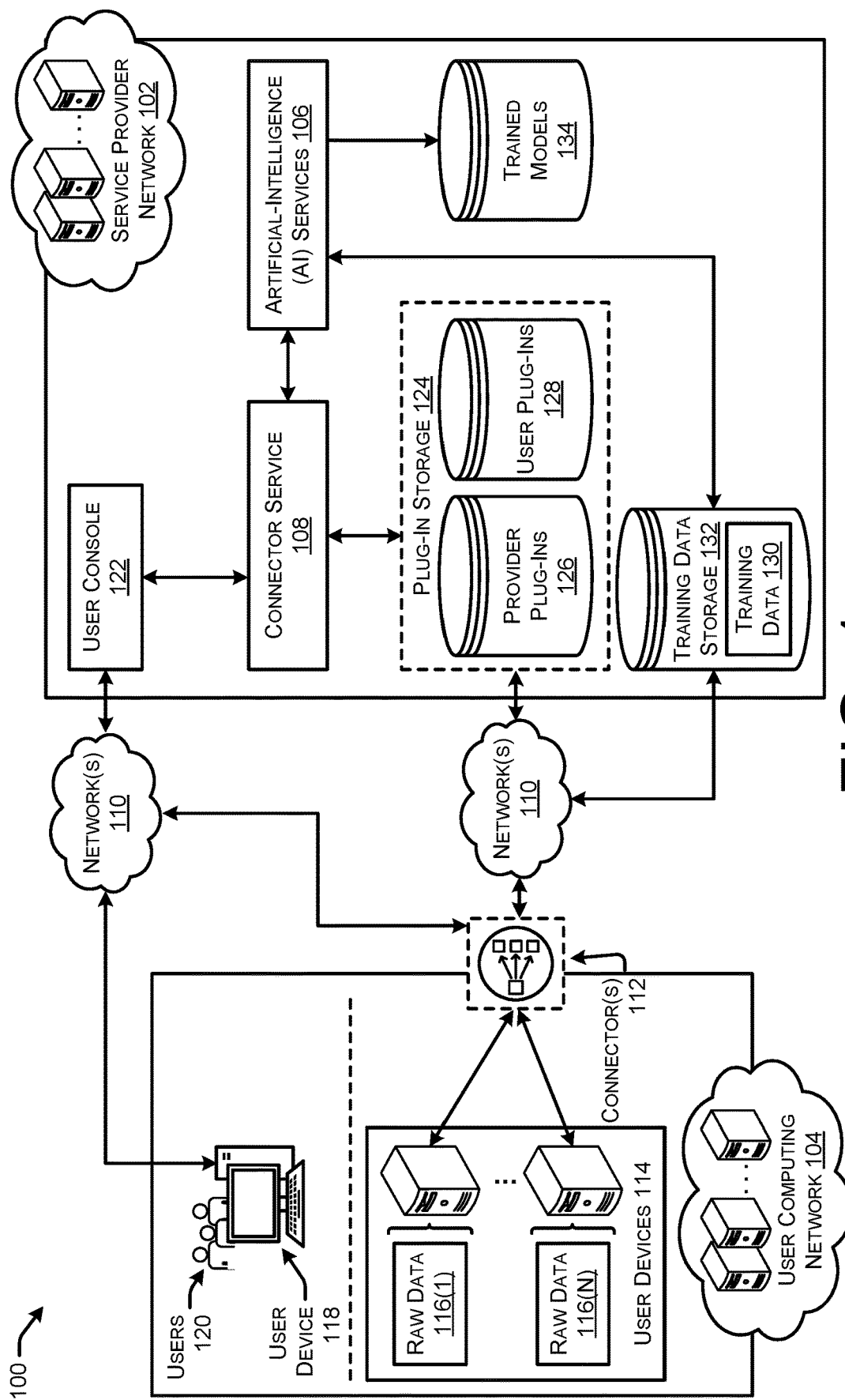
FIG. 1 illustrates a system-architecture diagram of an example environment in which a service provider network sends software plug-ins to a user computing network to enable pre-processing of raw data in the user computing network to generate training data.

This disclosure describes techniques for a service provider network to provide users with software components (such as plug-ins) that are configured to pre-process raw data stored locally in user computing networks to generate training data that is usable by artificial-intelligence (AI) services of the service provider network. The AI services offered by the service provider network may utilize models, such as machine-learning (ML) models, to provide various functionality to users. Users may desire to train those ML models with data sets that are specific to their environment or use cases. However, moving large amounts of raw data from the user computing network to the service provider network can consume significant bandwidth and take a lot of time, and the raw data may be private or sensitive such that the user does not want the raw data to leave their computing network. Accordingly, the service provider network can develop software components that are configured to pre-process and convert raw data into training data usable by various AI services. The software components can be provided to the user computing networks and executed locally to generate the training data that is usable by an identified AI service. The training data may be smaller in size than the raw data, and may remove sensitive or private information from the raw data, for example by having a set of features relevant to the AI services extracted from the raw data into a machine-consumable format such as a matrix or vector. The training data can then be sent to the service provider network and used by the AI services to train ML models for use by the user.

The service provider network may provide various types of AI services, such as translation services, image/video analysis services, text-analytics services, document-analysis services, and so forth. Many of the AI services use models, including ML models, to perform at least some of the functionality of the services. To train these ML models, the service provider may obtain data sets of documents, images, videos, etc., that are used as training data. Depending on the machine-learning algorithms used, the training data may be labeled with informative tags (referred to as "labels") such that an ML model learns to predict the labels when provided with the training data as input. During training, the internal parameters of the ML model are adjusted so that the ML model accurately predicts the labels from the training data, such that these learned parameters can be considered as an encoding of meaningful features in the data. This enables the ML model to make predictions with respect to the labels when provided with new data that it has not "seen" before. For instance, if a training image is marked with an informative tag indicating that the image depicts a "tree," then the model may learn that future images with similar features also likely depict a tree. These types of techniques are performed to train ML models that are specialized to perform functionality of the different AI services.

As noted above, users may desire to train ML models that are customized or specialized for their data sets. For instance, users may wish to utilize a fraud-detector service, but have an ML model trained to detect specific types of fraud that the users see in their industry. Accordingly, the service provider network may provide machine-learning algorithms and services for users to generate their own customized ML models for the various AI services. This may involve the user uploading data sets from their user computing networks to the service provider network in order to be processed into training data for the ML models. However, moving large amounts of raw data from the user computing network to the service provider network can consume significant bandwidth and take a lot of time, and the raw data may be private or sensitive such that the user does not want the raw data to leave their computing network.

Accordingly, the service provider network may develop software components or add-ons, such as plug-ins, that are specialized to pre-process the raw data into training data usable to train the ML models. In some examples, each AI service may have one or more respective plug-ins that are able to pre-process and convert raw data into training data that is usable to train the ML models. The software components may be executable by a connector that executes locally in the user computing networks. Thus, the users may download or be provided with a connector (e.g., virtual machine, container, etc.) that is capable of executing the software components for the various AI services.

To initiate the process, a user may send a request (e.g., via a user console) to an AI service to be provided with a customized or specialized ML model for the user. The AI service may send a request to a connector service of the service provider network to help the user provide training data for the ML model. The connector service may provide the connector in the user computing network with a control-plane instruction regarding which software component(s) are needed to convert the raw data into usable training data for the desired AI service. The connector may then download or otherwise receive the software component(s), identify the location(s) in the user computing network at which the raw data is stored, and begin pre-processing and/or converting the raw data into training data. In some instances, multiple instances of the connector may run the software component(s) in parallel to process the raw data into training data. After completing the processing, the connector may send the training data to a storage location in the service provider network that is accessible by the AI service and/or another service that is configured to train the models. The models, once trained, are accessible to the user and the AI service such that the user may utilized customized ML models that are trained (at least partly) using raw data stored in their user computing networks.

Although the techniques described herein are with reference AI services, the techniques are equally applicable in other environments where is may be advantageous to process data in a local network or domain before transmitting to another domain or network. As described herein, raw data may generally comprise any type of data in any format that needs at least some processing, analyzing, converting, etc., to be in a format usable to train a model. The training data described herein may comprise any type of data that is in a format usable by a training algorithm, such as an ML algorithm, to train a model using any training technique.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 sends software plug-ins to a user computing network 104 to enable pre-processing of raw data in the user computing network to generate training data.

Generally, the service provider network 102 may comprise a secure network-based (e.g., cloud-based) services platform that offers various resources to users, such as compute power, database storage, content delivery and other functionality. The service provider network 102 may provide various services to users 106 to fulfil their computing resource needs, such as cloud-based computing resources. For example, the service provider network 102 may provide cloud-based, scalable, and network accessible compute power services, storage services, database services, and/or other services.

The service provider network 102 (or "cloud" provider network 102) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc.

The service provider network 102 may further provide various artificial-intelligence (AI) services 106 that provide functionality to users, such as translation services, image/video analysis services, text-analytics services, document-analysis services, and so forth. Additional details around the different AI services 106 is described below with respect to FIG. 4. Many of the AI services 106 use models, including ML models, to perform at least some of the functionality of the services. As noted above, users may desire to train ML models that are customized or specialized for their data sets. For instance, users may wish to utilize a fraud-detector AI service, but have an ML model trained to detect specific types of fraud that the users see in their industry. Accordingly, the service provider network 102 may provide machine-learning algorithms and services for users to generate their own customized ML models for the various AI services 106. This may involve the user uploading data sets from their user computing networks 104 to the service provider network 102 in order to be processed into training data for the ML models. However, moving large amounts of raw data from the user computing network 104 to the service provider network 102 can consume significant bandwidth and take a lot of time, and the raw data may be private or sensitive such that the user does not want the raw data to leave their computing network 104.

The AI services 106 may communicate with a connector service 108 of the service provider network 102 in order to obtain data from the user computing network 104. The connector service 108 may communicate over one or more networks 110, wired and/or wireless (e.g., WANs, PANs, LANs, etc.), and with connectors 112 in user computing networks 102 to send and receive data in and out of the service provider network 102. The connector service 108 may communicate with the connector 112 and provide various instructions, such as control-plane instructions. The connector service 108 may comprise a gateway with which connectors 112 running in the user computing network 104 can direct requests between each other. The connector 112 may be a virtual machine instance, a container, an Operating System (OS) image, etc., that can run software components, such as plug-ins. The connector 112 may run a single instance of the plug-ins, and/or multiple instances at least partly in parallel. Thus, the connector 112 may be one, or multiple connectors 112 running at least partially in parallel. That is multiple connectors 112 may be running the same, or different, plug-ins 126/128 at least partially in parallel as different computing devices, different virtual machines, different containers, different functions or processes, etc.

Generally, the traffic and operations of the service provider network 102 may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

As noted above, users 120 associated with the user computing network 104 may request, via a user console 122, that the AI service 106 create a trained ML model that is customized for the user 120. Users 120 may interact with the service provider network 102 across the networks 100 (e.g., the internet) via one or more interface(s), such as through use of application programming interface (API) calls, via a console 122 implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The user console 122 may be part of, or serve as a front-end to, a control plane of the service provider network 102 that includes "backend" services supporting and enabling the services that may be more directly offered to users 120.

After the AI service 106 receives the request from the user 120, the AI service 106 may send a request to the connector service 108 to help the user 120 provide training data 130 for a trained model 134 (also referred to herein as "ML model," "trained ML model," etc.). The connector service 108 may provide the connector 112 in the user computing network 104 with a control-plane instruction regarding which software component(s) are needed to convert the raw data 116 into usable training data 130 for the desired AI service 106. The connector 112 may then download from the plug-in storage 124, or otherwise receive/obtain at least one of a provider plug-in 126 or a user plug-in 128. That provider plug-ins 126 may be provided by the service provider network 102, and the user plug-ins 128 may be provided by users 120. The plug-ins 126/128 are generally any type of add-on or extension, computer software that adds new functionality to a host program (e.g., the connector 112). The plug-ins 126/128 may be configured to be executed but the connector 112 and pre-process raw data that is stored on user devices 114.

The connector service 108 may instruct the connector 112 as to which plug-ins 126/128 to download and execute, and also what raw data 116 stored in the user computing network 104 to use. The raw data 116 may generally comprise any type of data in any format that needs at least some processing, analyzing, converting, etc., to be in a format usable to train a model 134. The training data 130 described herein may comprise any type of data that is in a format usable by a training algorithm, such as an ML algorithm, to train a model 134 using any training technique including supervised learning, unsupervised learning, and/or semi-supervised learning. The algorithms may include regression algorithms that model the relationship between variables and are iteratively refined using a measure of error in the predictions made by the models (e.g., Ordinary Least Squares Regression, (OLSR), Linear Regression, Logistic Regression, Stepwise Regression, Multivariate Adaptive Regression Splines (MARS), Locally Estimated Scatterplot Smoothing (LOESS), etc.). The algorithms may also include instance-based algorithms that create instance-based learning models 134 which utilize a decision problem with instances or examples of training data that are deemed important or required to the model (e.g., k-Nearest Neighbor (kNN), Learning Vector Quantization (LVQ), Self-Organizing Map (SOM), Locally Weighted Learning (LWL), Support Vector Machines (SVM), etc.). Further, the algorithms may include decision-tree algorithms that use the training data 130 and construct a model of decisions based on actual values of attributes in the data. The decision-tree algorithms may use decisions fork in tree structures until a prediction decision is made for a given record, and decision trees are trained on training data 130 for classification and regression problems. Further, the algorithms may include Bayesian Algorithms (e.g., Naive Bayes, Gaussian Naive Bayes, Multinomial Naive Bayes, etc.), Clustering algorithms (e.g., k-Means, k-Medians, Hierarchicaly Clustering, etc.), Neural Network Algorithms, Deep Learning Algorithms (e.g., Convolutional Neural Network (CNN), Recurrent Neural Networks (RNNs), Long Short-Term Memory Networks (LSTMs), Stacked Auto-Encoders, Deep Boltzmann Machine (DBM), Deep Belief Networks (DBN), etc.), and/or any other known type of machine-learning algorithms. The training data 130 may generally be in a service-expected format for the AI service 106 and/or the type of ML algorithm to train the trained models 134.

The connector 112 may obtain the raw data 116 that was requested, execute the one or more plug-ins 126/128, and convert the raw data 116 into training data 130. The connector 112 may then send the training data over the network(s) 110 and to training data store 132 in the service provider network 102. The AI service 106, and/or a machine-learning service operated by the service provider network 102, may use the training data 130 to create trained models 134. The trained models 134 may comprise any type of model, including ML models 134. The trained models 134 may be trained using various techniques and algorithms, including any known machine-learning algorithms. Once the trained models 134 are generated or created by the AI service 106, the trained model 134 may be deployed to a hosted endpoint for use and/or testing.

In some examples, the connector 112 may download and use multiple plug-ins 126/128 that provide different tasks or capabilities, and use them in combination to process the raw data 116. That is, multiple plug-ins 126/128 may be chained together and provide different types of pre-processing in different orders. As an example, the plug-ins 126/128 may process raw image data 116 where a first plug-in 126/128 converts color images to grayscale, a second plug-in 126/128 performs data augmentation, image to vector, etc., and a third plug-in 126/128 may convert the processed images into a vector format (e.g., feature data).

In some instances, the raw data 116 may be text data, image data, binary data, and/or any other type of data. For instance, the raw data 116 may be image data that is converted by the connectors 112 using plug-in(s) 126/128 into training data 130 that comprises feature data representing the image(s) in the image data of the raw data 116. As another example, the raw data 116 could be a binary file that represents an executable program or file. In such instances, the AI service 106 may be a malware-detection service, or an antivirus-detection service 106. The raw data 116 may then be converted by the connector(s) 112 running plug-in(s) 126/128 to generate training data 130 which may be a binary signature representing the file, or text data according to a predefined schema or set of fields. In such examples, the training data 130 (e.g., binary signature, text file, etc.) be used to train a trained model 134 that is usable by an antivirus-detection service 106 to determine whether files are malware/viruses or not. For instance, the raw data 116 could be binary files that is converted into the training data 130 which could be feature data such as filename, file size, dependencies, embedded scripts, script function names, function signatures, etc. Further, the features could be in a specific file format/schema, such as Executable and Linkable Format (ELF), .bss header, .data header, .ELF header, etc. Additionally, the features of the training data 130 may be opcode from the file chunks of each binary file, such as a feature that represents bytes 102 to 109. In some implementations the features may not represent any human-specified concepts, but rather may be properties or elements of the data that a machine learning system has learned are indicative of the desired output. As an example, data may be pre-processed into a feature vector.

Although described as a plug-in, the plug-ins 126/128 can be any type of software component capable of, or configured to, process various types of data into other formats.

Figure 2:
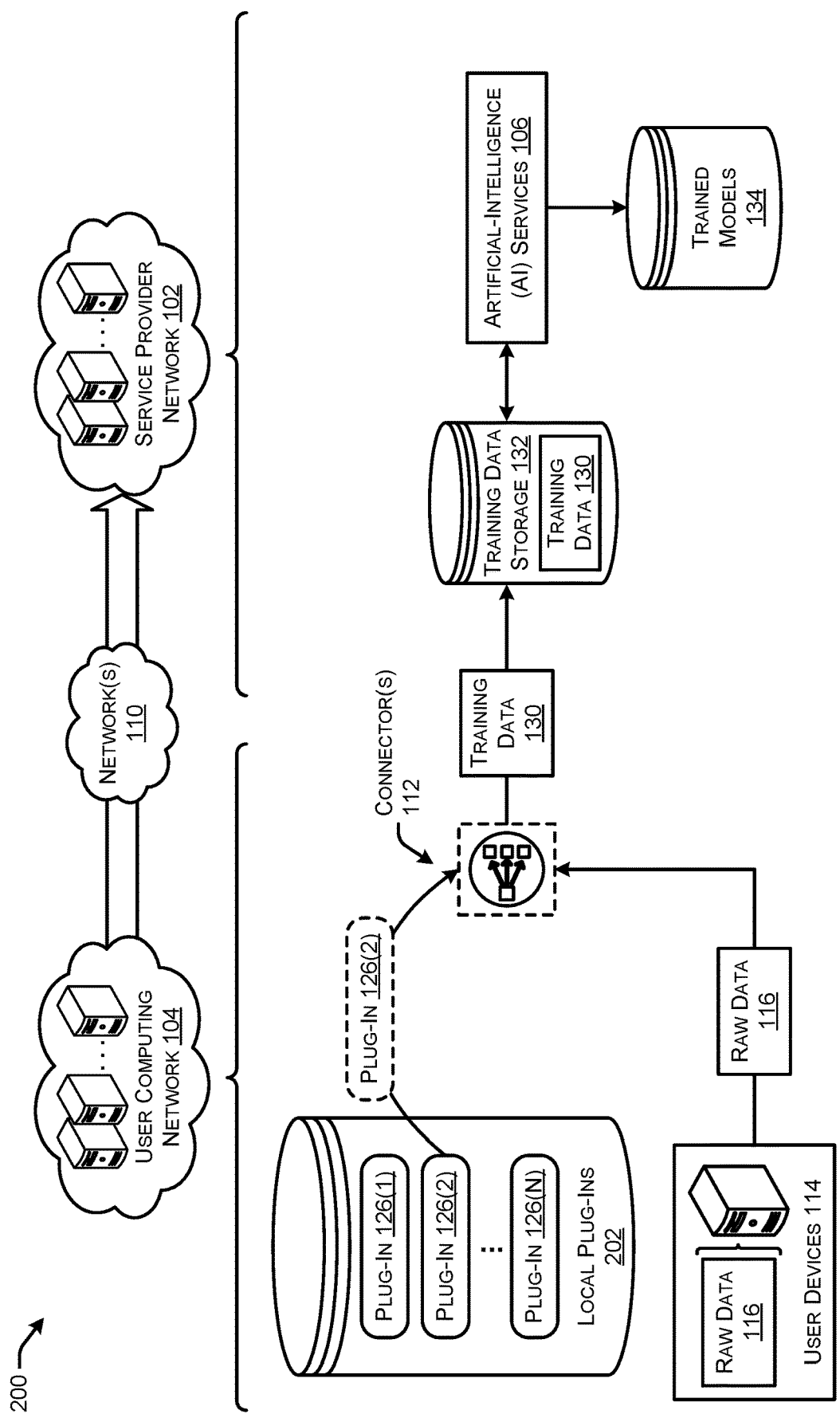
FIG. 2 illustrates a system-architecture diagram of an example environment in which a user computing network uses a software plug-in to process raw data into generate training data, and send the training data to a service provider network that provides an AI service.

FIG. 2 illustrates a system-architecture diagram of an example environment 200 in which a user computing network 104 uses a software plug-in 126 to process raw data 116 into generate training data 130, and send the training data 130 to a service provider network 102 that provides an AI service 106.

In some instances, the connector 112 may download and store various plug-ins 126 that are stored locally as local plug-ins 202. In some instances, the plug-ins 126/128 may be stored locally in response to the user 120 registering for use of an AI service 106. For instance, after registering to use one or more AI services 106, the plug-ins 126 associated with those service(s) 106 may be downloaded by the connector 112. Then, when the AI service 106 sends a request to the connector service 108 for training data 130 to generate a trained model 134, the connector 112 may already have access to the necessary plug-in 126 to generate the training data 130 and send it to the training data storage 132. In some examples, the raw data 116 may comprise binary data (or in a specific format) where the virus affected files are in a binary or programming script files, or dynamic library, or executable files, the connector 112 may run one or more plug-ins 126/128 that convert the binary data (or other format) into the consistent format of the training data 130 that is usable to train the models 134. The training data 120 may present, in consistent format, the portions of the raw data 116 that are indicative as to whether a virus exists or not.

Figure 3:
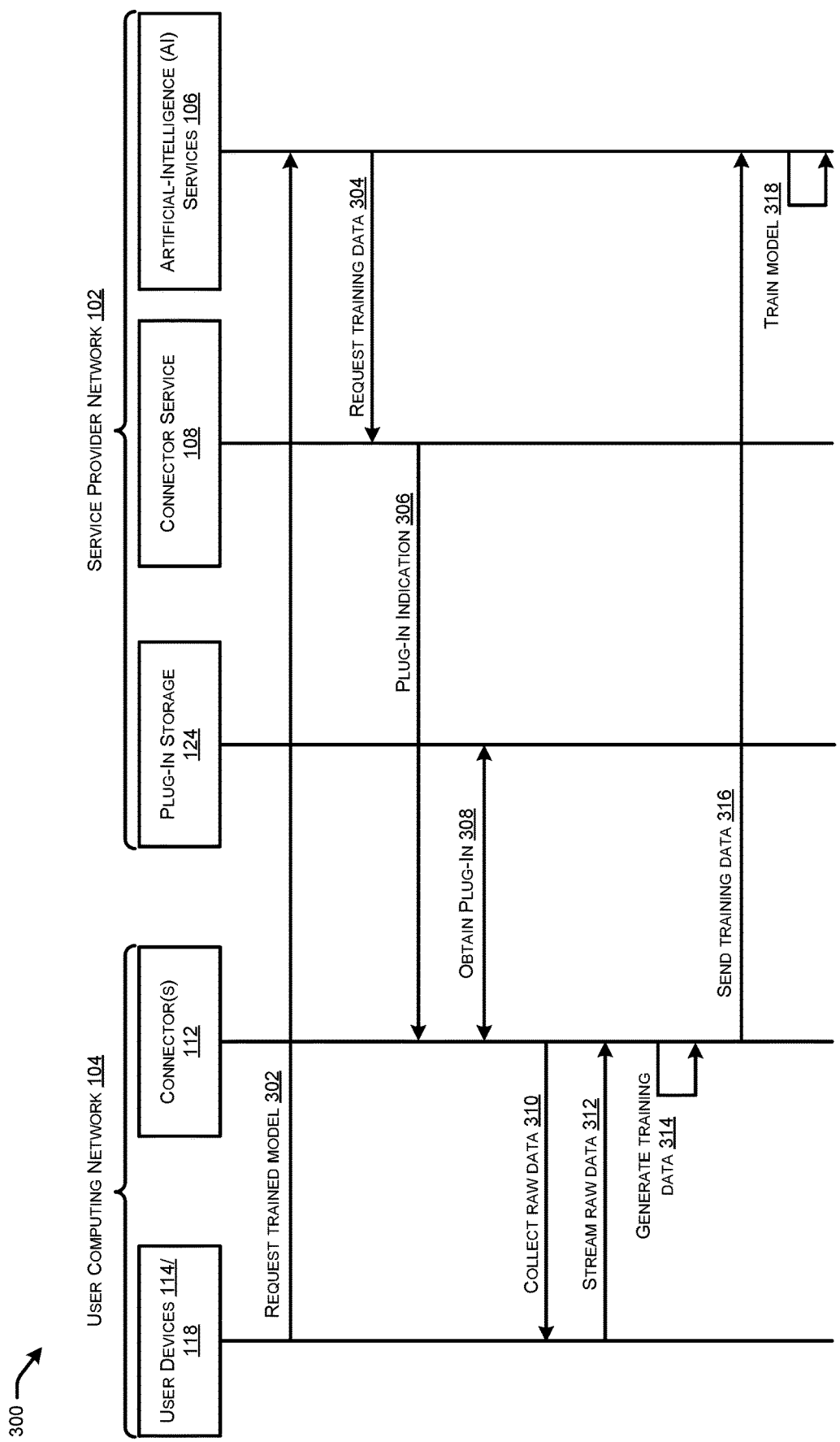
FIG. 3 illustrates a flow diagram of an example method for a user computing network to be provided with a software plug-in that can be executed locally to process raw data into training data, and to send the training data to an AI service of a service provider network to train a model.

FIG. 3 illustrates a flow diagram of an example method 300 for a user computing network 104 to be provided with a software plug-in 126/128 that can be executed locally to process raw data 116 into training data 130, and to send the training data 130 to an AI service 106 of a service provider network 102 to train a model 134.

At 302, the user device 118 may send a request to the AI service 106 for a trained model 134. For instance, the user 120 may access the user console 122 to send the request to the AI service 106 for the trained model 134.

At 304, the AI service 106 may send a request to the connector service 108 for training data 130. For instance, the AI service 106 may send a control-plane message to the connector service 108 for training data 132 where the request may include an indication of a user account, the AI service 106, the format of the training data 130, the necessary plug-ins 126/128, etc.

At 306, the connector service 108 may provide a plug-in indication to the connector 112, which may be a control-plane message. The connector service 108 may then obtain the plug-in 126/128 at 308 from the plug-in storage 124 (e.g., download).

At 310, the connector 112 may collect and/or locate the raw data 116. For instance, the user 120 may have used the user console 122 to provide an indication of a location at which the raw data 116 is stored. At 312, the connector 112 may stream the raw data 312 from the storage location on the user devices 114/118 to be used to generate the training data 130. At 314, the connector 112 (or connectors 112) may execute the one or more plug-ins 126/128 to pre-process and/or the raw data 116 to generate or result in the training data 130.

At 316, the connector 112 may send the training data 130 to the training data storage 132. For instance, the connector 112 may send a stream of data-plane traffic to the AI service 106 and/or the training data storage 132 that represents the training data 130. At 318, the AI service 106 and/or a machine-learning service may train one or more trained models 134 using the training data 130.

Figure 4:
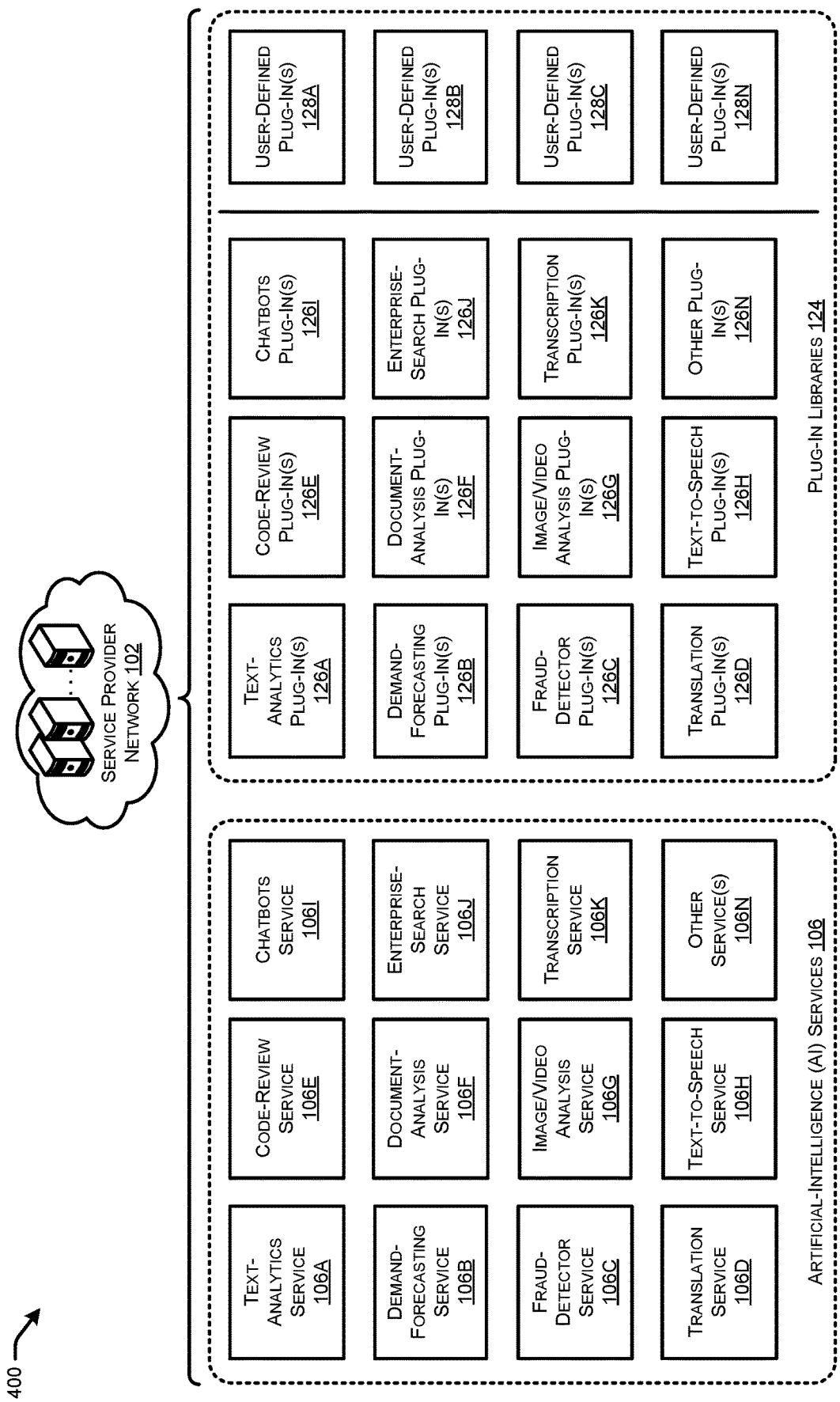
FIG. 4 illustrates a component diagram of example AI services provided by a service provider network as well as plug-ins for the AI services that are executable to generate training data used to train ML models for the AI services.

FIG. 4 illustrates a component diagram of example AI services 106 provided by a service provider network 102 as well as plug-ins for the AI services 106 that are executable to generate training data 130 used to train ML models 134 for the AI services 106. The AI services may include one or more of a text-analytics service 106A used to perform natural language processing to extract insights and relationships from unstructured text, a demand-forecasting service 106B configured to build forecasting models based on machine-learning forecasting technology, and a fraud-detector service 106C configured to identify potentially fraudulent online activities. Additionally, the AI services 106 may include a translation service 106D configured to perform effective translations in multiple languages, a code-review service 106E configured to automatically review code and identify high-resource intensive lines of code, and/or a document-analysis service 106F configured to automatically extract text and data from documents. Even further, the AI services 106 may include an image/video analysis service 106G configured to identify objects in or classify images and videos, a text-to-speech service 106H configured to turn text into machine speech to give voice to software programs, a chatbots service 106I configured to build smart agents that are usable for customer service and improve contact centers, an enterprise-search service 106J that may add natural language search capability to applications and software so users can easily find information they need, a transcription service 106K configured to add speech-to-text capabilities for applications and workflows of users, and/or other services (such as forecasting and recommendation services).

Another AI service 106 provided may be a virus-detection service 106 where training data 130 represents various files, including affects filed, and the trained models 134 are trained to determine whether or not a file has been infected or not. Thus, the AI services 106 may include a virus-detection service 106 that uses one or more trained models 134 to detect files that are infected with a virus. The raw data 116 may comprise actual files, including infected files, and the connector 112 may run one or more plug-ins 126/128 that convert the files into consistent formats that represent the data in the files that are helpful in detecting a virus.

Further, the plug-in libraries 124 may include respective plug-ins 126 for each of the services 106, as well as one or more user-defined plug-ins 128. In some instances, each of the AI services 106 may have or be associated with one or more plug-ins 126/128 that are configured to transform raw data 116 into training data 130. For example, each AI service may require training data that includes input data having a specific set of features that are relevant to the desired output, and that has a specific set of labels corresponding to the desired output. Further, a particular model used in an AI service may require that input data be structured in a particular format (e.g., a specific number and ordering of features, represented for example as values in a vector or matrix). The plug-in for a particular AI service can be configured to transform raw data 116 into training data 130 having those features for input in the needed format and having labels for output. In some instances, the plug-ins 126/128 may overlap and be used for multiple AI services 106 as well.

Figure 5:
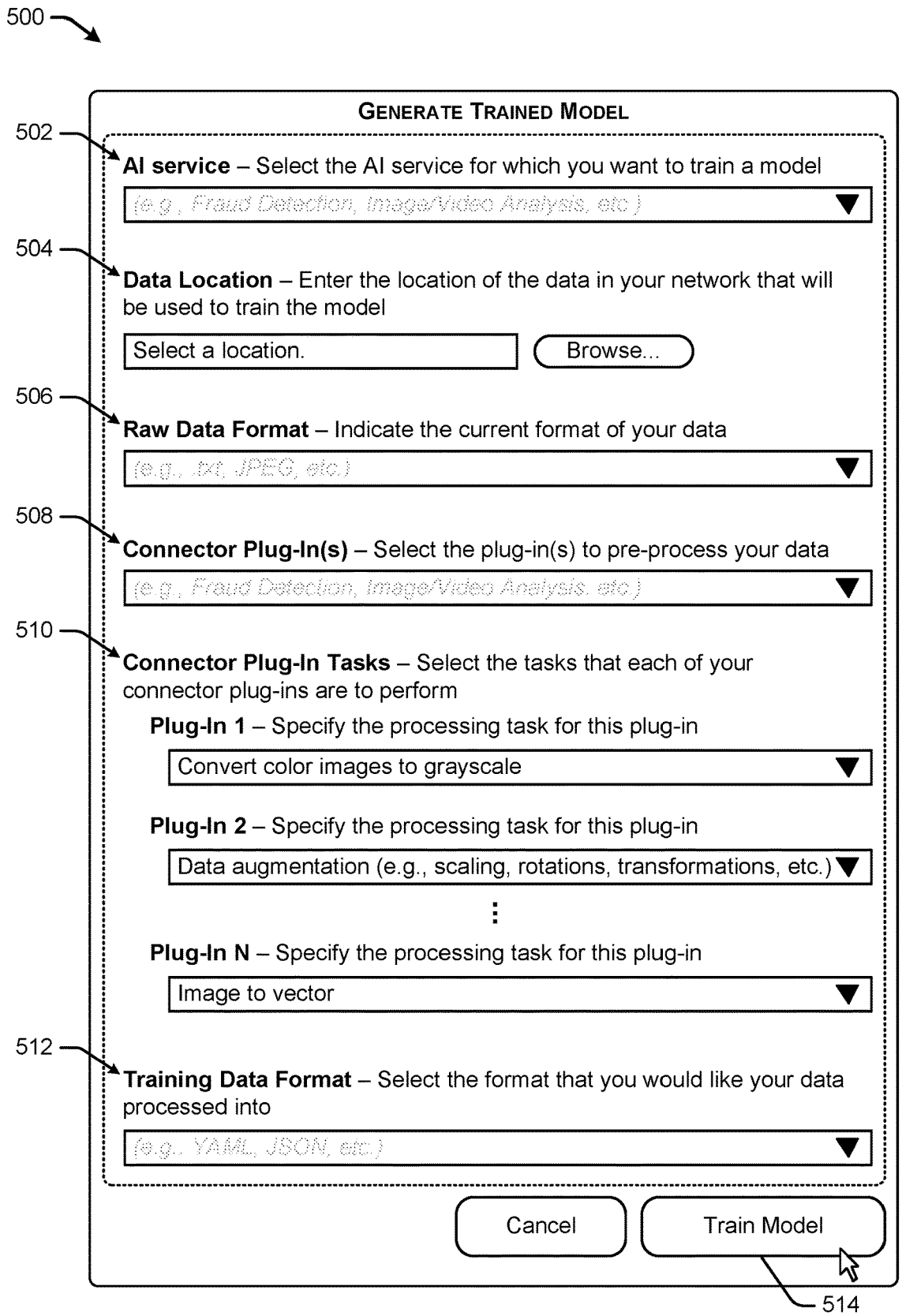
FIG. 5 illustrates a graphical user interface through which a user of a service provider network can provide input for generating a trained model usable by an AI service.

FIG. 5 illustrates a graphical user interface (GUI) 500 through which a user 120 of a service provider network 102 can provide input for generating a trained model 134 usable by an AI service 106. The GUI 502 may include an option 502 for the user 120 to indicate the AI service for which they would like to create a trained model 134. The user 120 may select from the different AI services 106 for which they are registered, and/or for which they would like to register. Further, the GUI 502 may include an option 504 through which the user 120 can indicate a location in the user computing network 104 at which the raw data 116 is stored. The data location 504 may be used by the connector 112 to access the raw data 116. The GUI 500 may include an option 506 through which the user 102 can indicate a format of the raw data 116, which may be any data format that needs to be pre-processed, converted, and/or otherwise modified into training data 130 for the AI services 106. The GUI 500 may include an option 508 where the user 120 can indicate a connector plug-in 126 for the AI service 106. For instance, the user 120 may already know which plug-in(s) 126/128 are needed to convert the raw data 116 into training data 130 or use by the desired AI service 106.

The GUI 500 may additionally include an option 510 through which the user 120 can provide different tasks for the selected plug-ins 126/128 (e.g., convert a color image to grayscale, data augmentation, image to vector, etc.). As illustrated, multiple plug-ins 126/128 may be used in combination, or be daisy-chained, to generate a desired training data 130 for use by an AI service 106. Additionally, the GUI 500 may include an option 512 where the user can indicate a training data format for the training data 130 (e.g., YAML, JSON, etc.). The user may select the option 514 indicating that they would like to train the model 514, and the raw data 116 may be converted into training data 130 after receiving input indicating a selection of the option 514.

Figure 6:
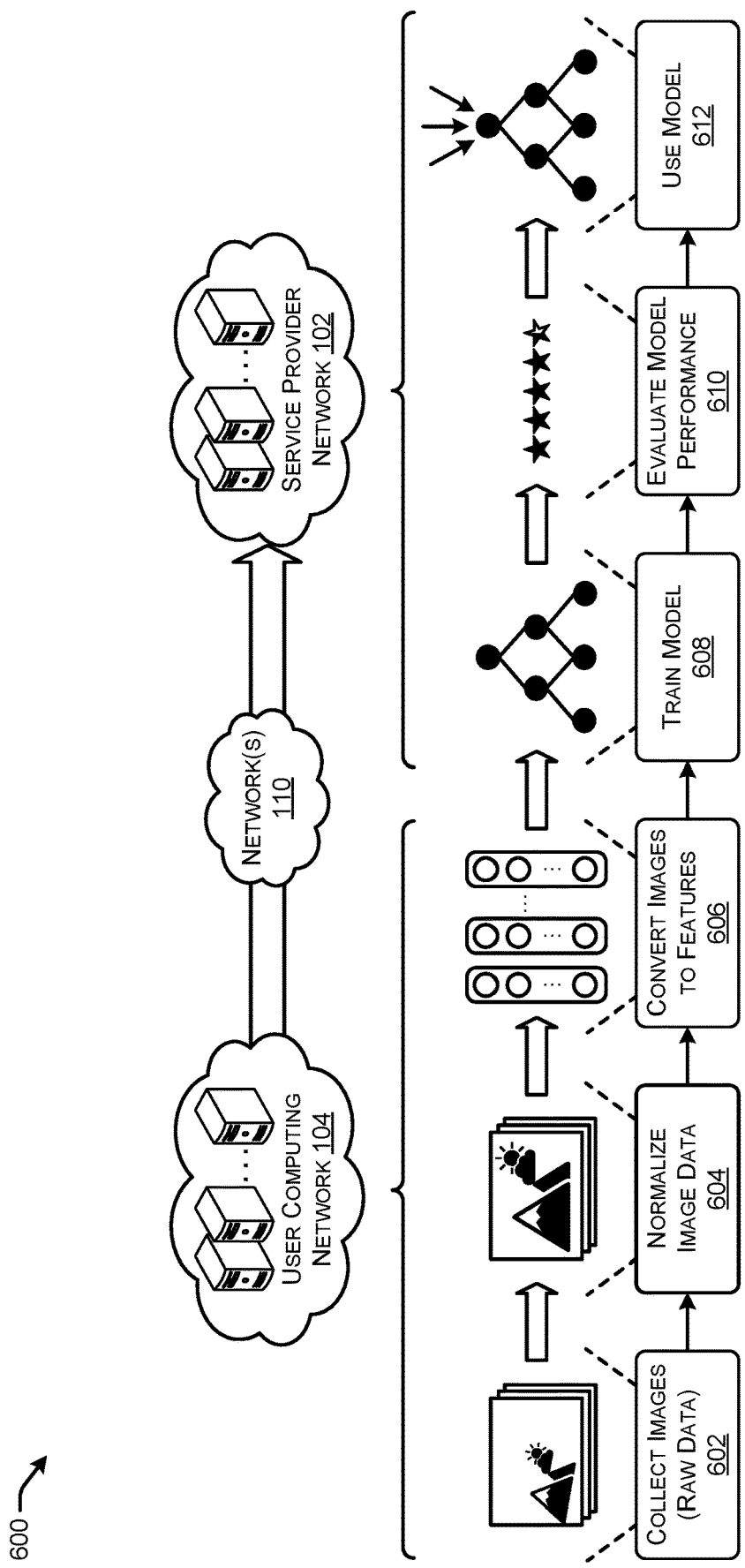
FIG. 6 illustrates a flow diagram where a user computing network uses a plug-in to pre-process image data into feature data, and providing the feature data to a service provider network to train a model to process image data.

FIG. 6 illustrates a flow diagram 600 where a user computing network 104 uses a plug-in to pre-process image data into feature data, and providing the feature data to a service provider network to train a model to process image data. In some instances, feature data may include feature vectors where one or more feature vectors represent an image in a mathematical format.

At 602, the user computing network 104 may collect images (e.g., raw data 602). In some instances, the images may be collected as part of an application or service provided by the user computing network 104. At 604, the user computing network 104 may normalize the image data. For instance, one or more plug-ins 126/128 may perform various pre-processing on the image data, such as converting color images to grayscale, data augmentation (e.g., scaling, rotations, transformations, etc.), and/or other processing activities.

At 606, the connector 112 may run one or more plug-ins 126/128 to convert the images to features (e.g., feature data) using an image-to-vector technique. For instance, the connector 112 may run the plug-in 126/128 to input an image, which may be a 3D array of shape (e.g., length, height, and depth), into an algorithm that converts the image into a vector of shape (length, height, and depth). Stated otherwise, the connector 112 may run plug-in(s) 126/128 to receive the image and unroll, or reshape, the 3D array into a 1D vector for each of the images.

The features may be sent to the service provider network 102, and at 608, the AI service 106 may use the training data 130 to train a model 134. The training data 130 may be in a format that is usable by the AI service 106 to train a trained model 134. At 610, the AI service 106 (and/or another service) may evaluate the performance of the trained model 134 to determine how well the trained model 134 performed with sample data (e.g., input testing data to determine how well the trained models 134 perform). If the trained models 134 perform well during the evaluation state, the AI service 106 may then begin using the model 134 at 612 for the user 120.

Figure 7:
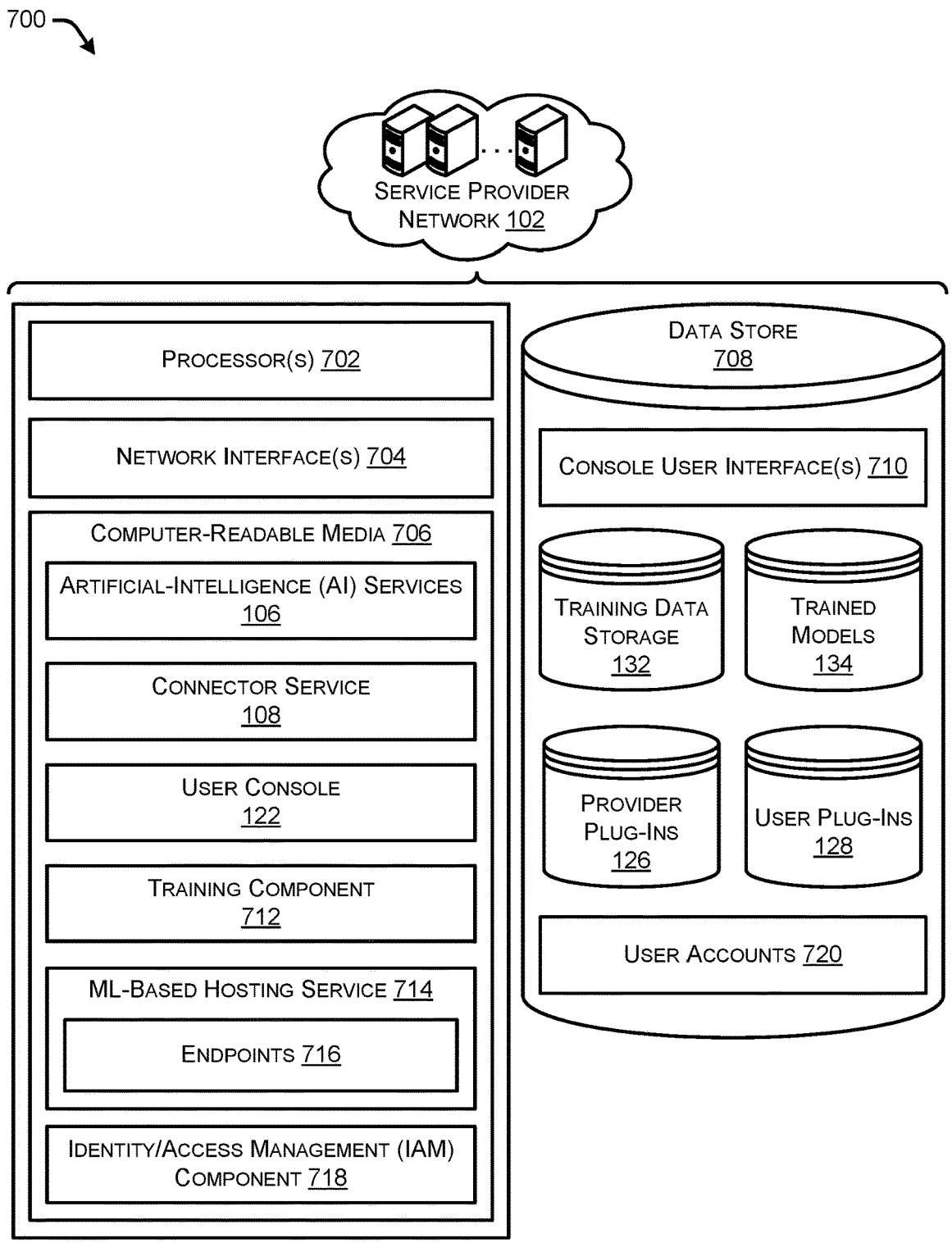
FIG. 7 illustrates a component diagram of example components of a service provider network that provides plug-ins to user computing networks to pre-process raw data into training data to train models for AI services.

FIG. 7 illustrates a component diagram 700 of example components of a service provider network 102 that provides plug-ins 126/128 to user computing networks 104 to pre-process raw data 116 into training data 130 to train models 134 for AI services 106.

As illustrated, the service provider network 102 may include one or more hardware processors 702 (processors), one or more devices, configured to execute one or more stored instructions. The processor(s) 702 may comprise one or more cores. Further, the service provider network 102 may include one or more network interfaces 704 configured to provide communications between the service provider network 102 and other devices, such as the user device(s) 114/118, and/or other systems or devices in the service provider network 102 and/or remote from the service provider network 102. The network interfaces 704 may include devices configured to couple to personal area networks (PANs), wired and wireless local area networks (LANs), wired and wireless wide area networks (WANs), and so forth. For example, the network interfaces 704 may include devices compatible with Ethernet, Wi-Fi, and so forth.

The service provider network 102 may also include computer-readable media 706 that stores various executable components (e.g., software-based components, firmware-based components, etc.). In addition to various components discussed in FIG. 1, the computer-readable-media 706 may further store components to implement functionality described herein. While not illustrated, the computer-readable media 706 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include a data store 708 which may comprise one, or multiple, repositories or other storage locations for persistently storing and managing collections of data such as databases, simple files, binary, and/or any other data. The data store 708 may include one or more storage locations that may be managed by one or more database management systems. The computer-readable media 706 may store portions, or components, of the optimization service 104 described herein.

To utilize the services 106 provided by the service provider network 102, users 120 may register for an account with the service provider network 102. For instance, users 120 may utilize a user device 118 to interact with an identity and access management (IAM) component 718 that allows the users 120 to create user accounts 720 with the service provider network 102. The training component 712 may perform the various training techniques on behalf of the AI services 106 and perform the training operations described herein for using the training data 130 to train the train models 134. The user console 122 may provide various console user interfaces 710 configured to present information to a user 120 via the console 122, and receive user input via the user console 122.

The service provider network 102 may further include an ML-based hosting service 714 that uses endpoints 716 to host the trained ML models 134. Once a trained model 134 is finished being trained, the The computer-readable media 706 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 706 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 8:
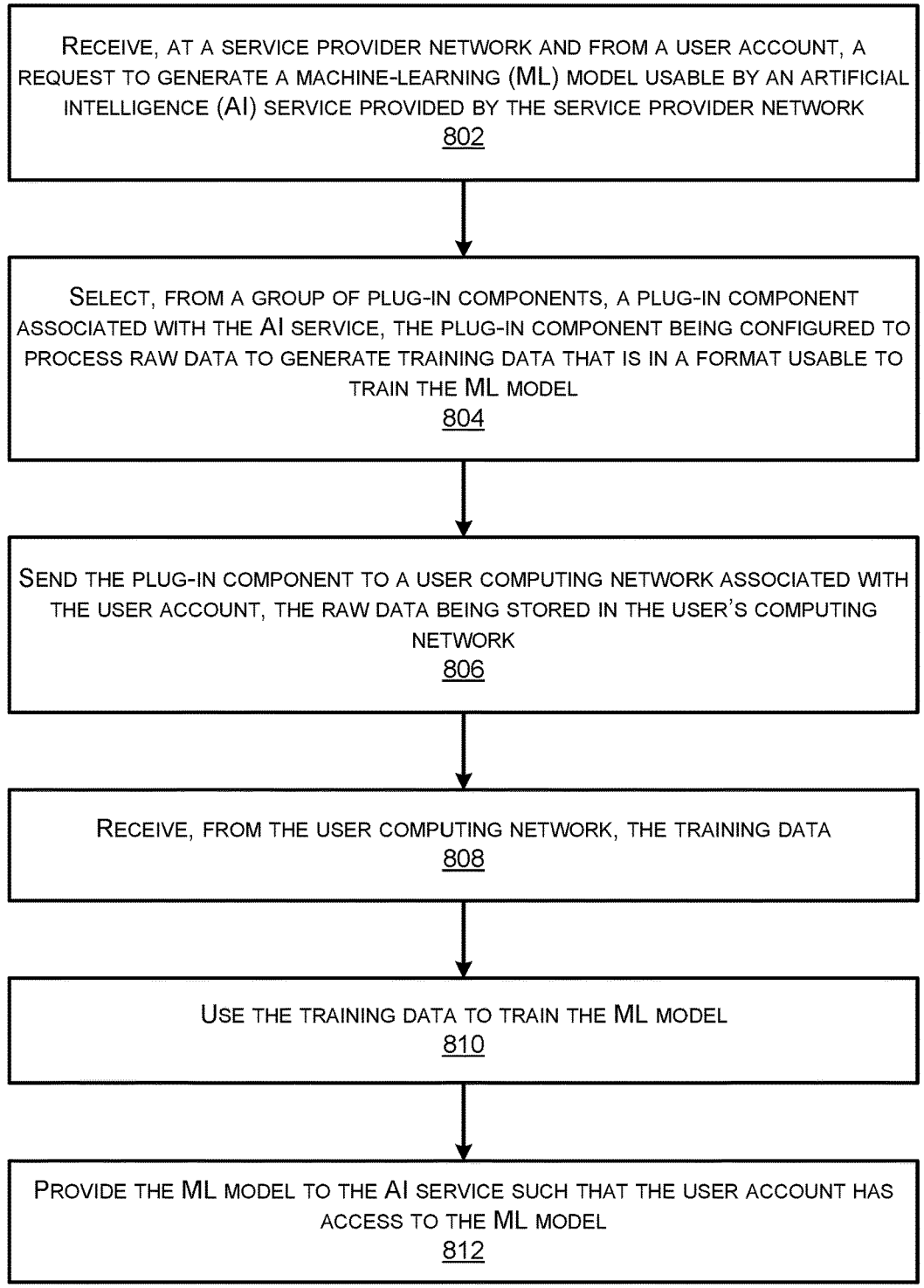
FIG. 8 illustrates a flow diagram of an example method for a service provider network to provide a software plug-in to a user computing network that processes raw data into training data, receiving training data from the user computing network, and use the training data to train an ML model.

FIG. 8 illustrates a flow diagram of an example method 800 that illustrates aspects of the functions performed at least partly by the service provider network 102 as described in this disclosure. The logical operations described herein with respect to FIG. 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 8 illustrates a flow diagram of an example method 800 for a service provider network 102 to provide a software plug-in to a user computing network 104 that processes raw data into training data, receiving training data from the user computing network, and use the training data to train an ML model.

At 802, the service provider network may receive, from a user account, a request to generate a machine-learning (ML) model usable by an artificial intelligence (AI) service provided by the service provider network. For instance, the user 120 may provide input via the GUI 500 indicating a request to generate a trained model 134.

At 804, the service provider network may select, from a group of plug-in components, a plug-in component associated with the AI service where the plug-in component being configured to process raw data to generate training data that is in a format usable to train the ML model. For example, the user 120 may provide an indication of an AI service 106 via the option 502 of the GUI 500, and the service provider network 102 may select a plug-in 126/128 that is associated with generating training data 130 from the raw data 116 that is usable to train the ML model 134.

At 806, the service provider network may send the plug-in component to a user computing network associated with the user account where the raw data being stored in the user computing network. For instance, the connector service 108 may provide a control-plane message indicating that the connector 112 is to download one or more plug-ins 126/128, and may also send an indication of a storage location of the raw data 116 that is to be processed.

At 808, the service provider network may receive, from the user computing network, the training data. For instance, the connector 104 may execute the plug-in(s) 126/128 to process the raw data 116 and generate the training data 130. The connector 112 of the user computing network 104 may then send the training data 130 to the training data storage 132 of the service provider network 102.

At 810, the service provider network may use the training data to train the ML model, and at 812 the service provider network may provide the ML model to the AI service such that the user account has access to the ML model.

Figure 9:
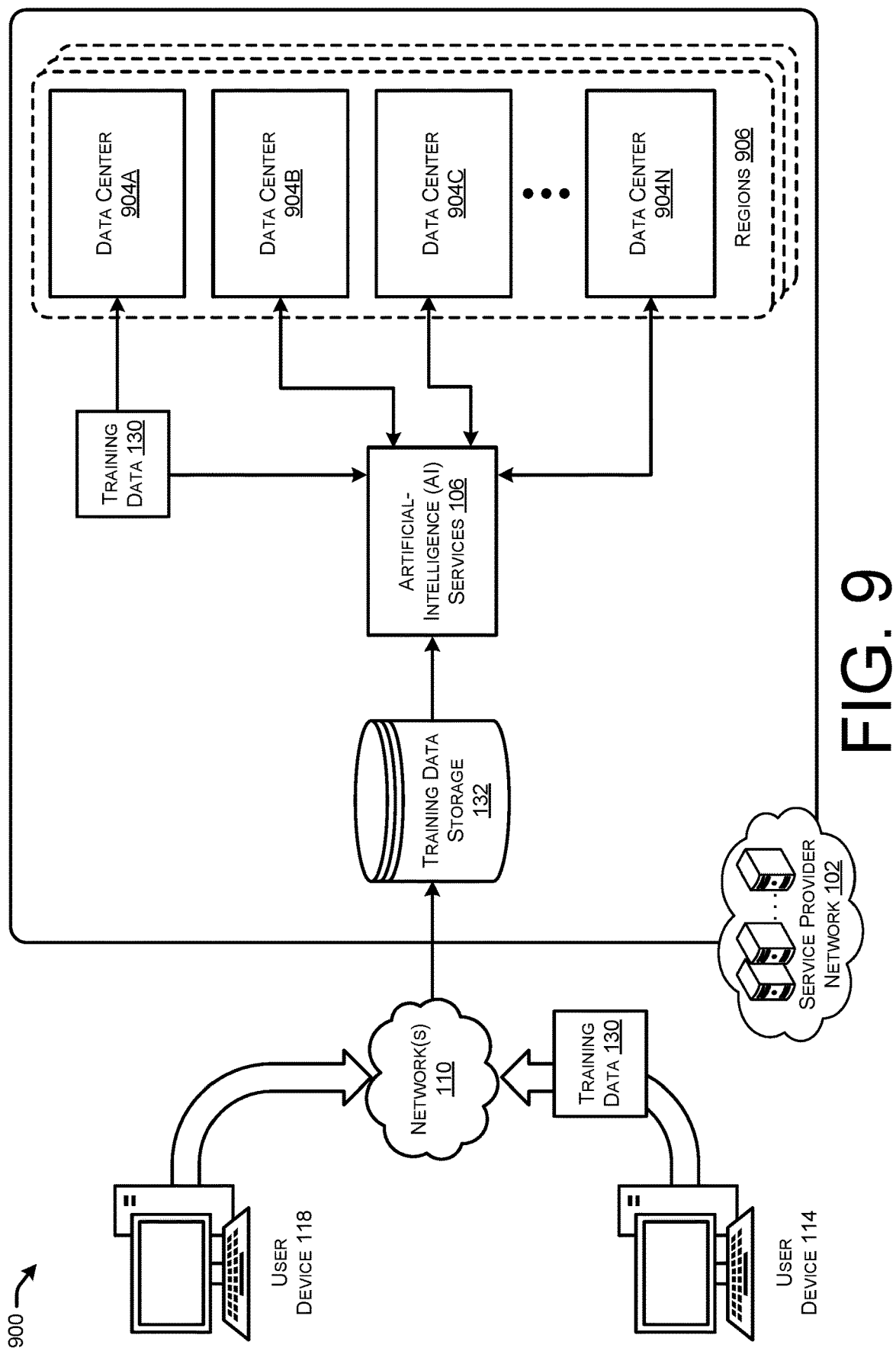
FIG. 9 is a system and network diagram that shows an illustrative operating environment that includes data centers of a service provider network that can be configured to implement aspects of the functionality described herein.

FIG. 9 is a system and network diagram 900 that shows an illustrative operating environment that includes data centers 904 in one or more regions 906 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations, or regions 906. One illustrative embodiment for a data center 904 that can be utilized to implement the technologies disclosed herein will be described below with regard to FIG. 10.

The users 120 of the user devices 118 that utilize the service provider network 102 may access the computing resources provided by the service provider network 102 over any wired and/or wireless network(s) 110, which can be a wide area communication network ("WAN"), such as the Internet, an intranet or an Internet service provider ("ISP") network or a combination of such networks. For example, and without limitation, a user device 118 operated by a user 120 of the service provider network 102 may be utilized to access the service provider network 102 by way of the network(s) 110. It should be appreciated that a local-area network ("LAN"), the Internet, or any other networking topology known in the art that connects the data centers 1004 to remote clients and other users can be utilized. It should also be appreciated that combinations of such networks can also be utilized.

The service provider network 102 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the service provider network 102 via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Figure 10:
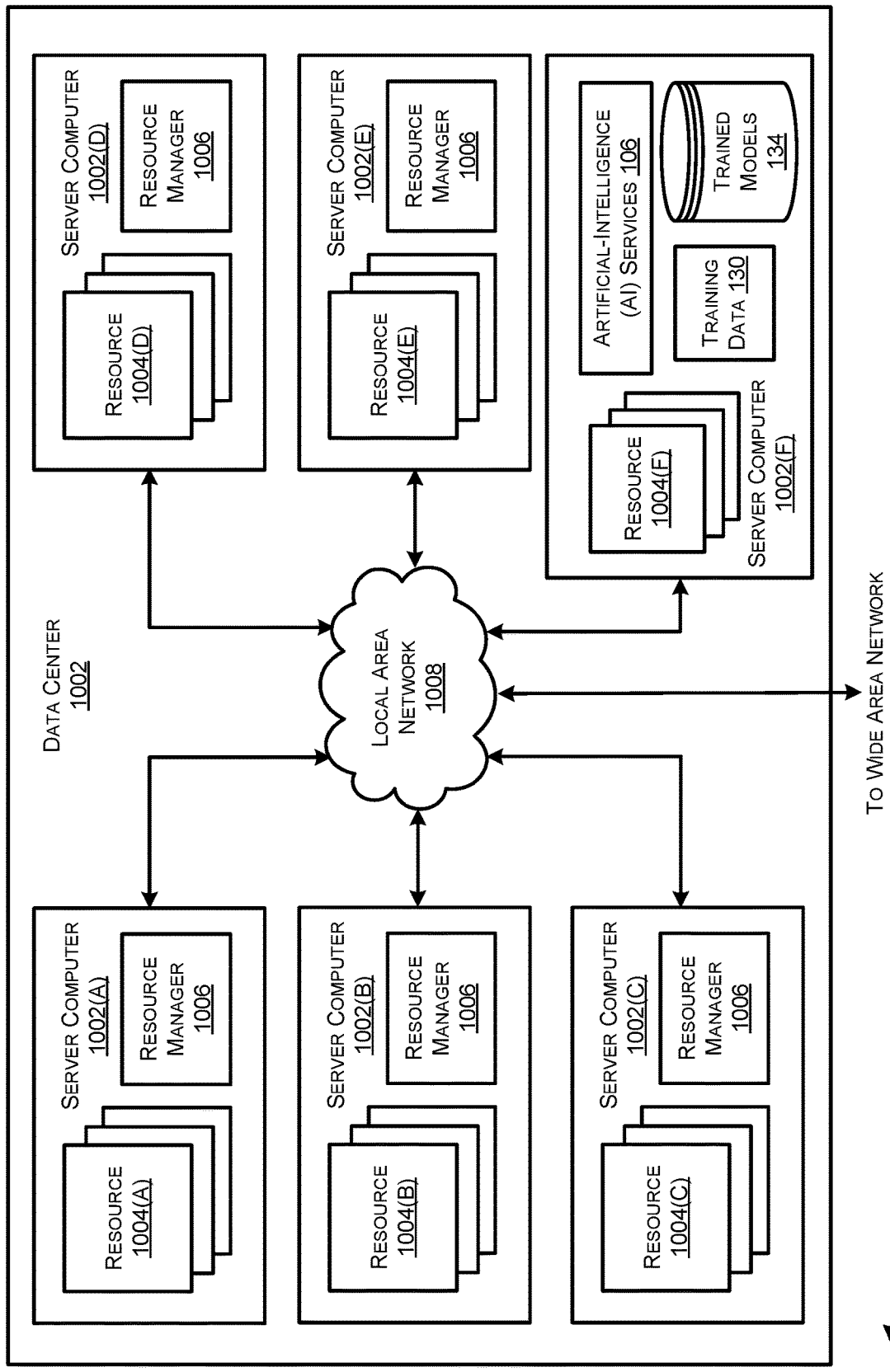
FIG. 10 is a computing system diagram illustrating a configuration for a data center that can be utilized to implement aspects of the technologies disclosed herein.

FIG. 10 is a computing system diagram 1000 that illustrates one configuration for a data center 1004 that implements aspects of the technologies disclosed herein. The example data center 1004 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, be included in, or correspond to, the computing devices 1002 described herein.

The server computers 1002 can be standard tower, rack-mount, or blade server computers configured appropriately for providing the computing resources described herein (illustrated in FIG. 10 as the computing resources 1004A-1004E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 1004 can also be configured to provide network services and other types of services.

In the example data center 1004 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1002A-1002F in each data center 1004, and, potentially, between computing resources in each of the server computers 1002. It should be appreciated that the configuration of the data center 1004 described with reference to FIG. 10 is merely illustrative and that other implementations can be utilized.

The data center 1004 shown in FIG. 10 also includes a server computer 1002F that can execute some or all of the software components described above. For example, and without limitation, the server computer 1002F (and the other server computers 1002) can generally be included in to the computing devices of FIG. 1 and be configured to execute components, including the components of the AI service 106, the connector service 108, and/or the other software components described above. The server computer 1002F can also be configured to execute other components and/or to store data for providing some or all of the functionality described herein. In this regard, it should be appreciated that the services illustrated in FIG. 10 as executing on the server computer 1002F can execute on many other physical or virtual servers in the data centers 1004 in various embodiments.

Figure 11:
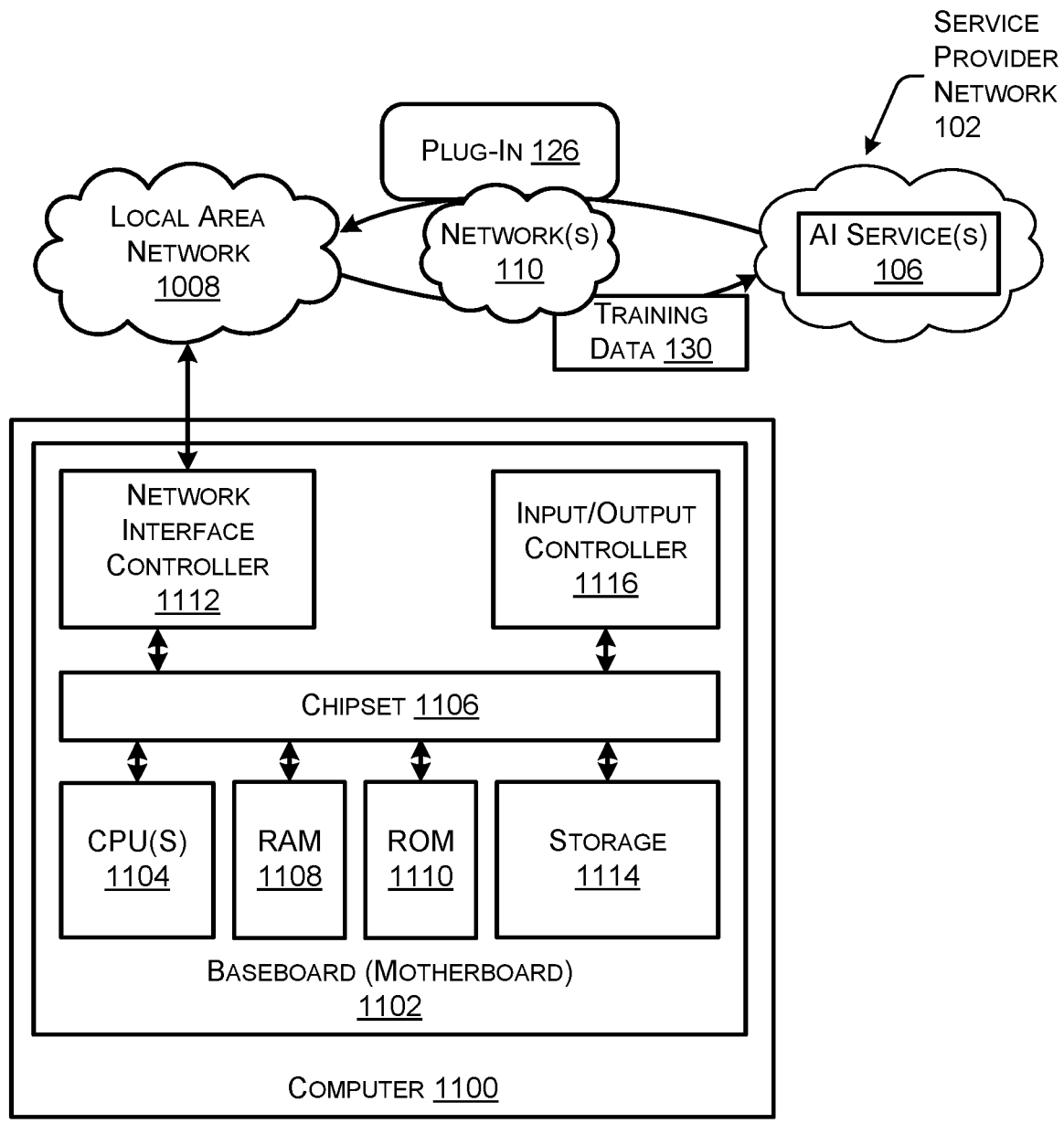
FIG. 11 is a computer architecture diagram showing an illustrative computer hardware architecture for implementing a computing device that can be utilized to implement aspects of the various technologies presented herein.

FIG. 11 is a computer architecture diagram showing an illustrative computer 1100 for implementing a computing device that can be utilized to implement aspects of the various technologies presented herein. The computer architecture shown in FIG. 11 illustrates a conventional server computer, workstation, desktop computer, laptop, tablet, network appliance, e-reader, smartphone, or other computing device, and can be utilized to execute any of the software components presented herein. In some examples, the server computer 1100 may correspond to, or be the same as or similar to, a computing device 102 described in FIG. 1.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1008. The chipset 1106 can include functionality for providing network connectivity through a network interface controller (NIC) 1112, such as a gigabit Ethernet adapter. The NIC 1112 is capable of connecting the computer 1100 to other computing devices over the network 1008 (or 108). It should be appreciated that multiple NICs 1112 can be present in the computer 1100, connecting the computer to other types of networks and remote computer systems.

The computer 1100 can include storage 1114 (e.g., disk) that provides non-volatile storage for the computer. The storage 1114 can consist of one or more physical storage units. The storage 1114 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage 1114 by detecting the physical states or characteristics of one or more particular locations within the physical storage units.

In addition to the storage 1114 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 102, and or any components included therein, may be supported by one or more devices similar to computer 1100. Stated otherwise, some or all of the operations performed by the service provider network 102, and or any components included therein, may be performed by one or more computer devices 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1114 can store an operating system utilized to control the operation of the computer 1100. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1114 can store other system or application programs and data utilized by the computer 1100.

In one embodiment, the storage 1114, RAM 1108, ROM 1110, and/or other computer-readable storage media may be encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various techniques described above. The computer 1100 can also include computer-readable storage media having instructions stored thereupon for performing any of the other computer-implemented operations described herein.

Generally, the computer 1100 may be an example of a computing device 102 (and other computing devices, servers, etc.) described herein. The CPU(s) 1104, RAM 1108, ROM 1110, storage 1114, bandwidth of the NIC 1111, and/or other resources of the computer 1100 may be allocated to one or more different VM instances as described herein based on the VM instance types.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
   receiving, at a service provider network and from a user account, a request to generate a machine-learning (ML) model usable by an artificial intelligence (AI) service provided by the service provider network;
   selecting, from a group of plug-in components, a plug-in component associated with the AI service, the plug-in component being configured to process raw data to generate training data that is in a format usable to train the ML model;
   sending the plug-in component to a user computing network associated with the user account, the raw data being stored in the user computing network;
   receiving, at the service provider network from the user computing network, the training data from the plug-in component;
   training the ML model using the training data and by computing resources of the service provider network; and
   providing the ML model to the AI service such that the user account has access to the ML model.

2. The computer-implemented method of claim 1, wherein:
   the raw data is image data including multiple images, the training data is first feature data representing the multiple images, and the plug-in component is configured to extract the first feature data from the image data; or
   the raw data is text data, the training data is second feature data, and the plug-in component is configured to extract the second feature data from the text data.

3. The computer-implemented method of claim 1, further comprising:
   sending, to the user computing network, a connector component configured to execute each plug-in component in the group of plug-in components; and establishing a secure connection between the service provider network and a device in the user computing network that is executing the connector component,
wherein the training data is received via the secure connection.

4. The computer-implemented method of claim 1, wherein the plug-in component is a first plug-in component and the AI service is a first AI service, further comprising:
storing a first association between the first plug-in component and the first AI service of a group of AI services provided by the service provider network; and
storing a second association between a second plug-in component of the group of plug-in components and a second AI service of the group of AI services,
wherein selecting the first plug-in component includes identifying the first association with the first AI service for which the ML model is requested to be generated.

5. A system comprising:
one or more processors; and
one or more non-transitory computer-readable media storing instructions that, when executed by the one or more processors, cause the one or more processors to perform operations comprising:
receiving a request to train a model that is usable by a service provided by a service provider network;
selecting, from a group of software components, a software component associated with the service, the software component configured to process first data in a first format to generate second data in a second format that is usable to train the model;
sending the software component to a user computing network in which the first data is stored;
receiving the second data from the user computing network; and
using the second data to train the model.

6. The system of claim 5, the operations further comprising:
sending, to the user computing network, a connector component configured to execute each software component in the group of software components.

7. The system of claim 5, the operations further comprising:
providing a user device associated with the user computing network with access to one or more user interfaces (UIs) configured to receive input from a user;
receiving, via the one or more UIs, first input that indicates the first format of the first data; and
receiving, via the one or more UIs, second input that indicates the second format is a desired format,
wherein selecting the software component is based at least in part on at least one of the first input or the second input.

8. The system of claim 5, the operations further comprising receiving, from a user device associated with the user computing network, input indicating one or more computing devices in the user computing network at which the first data is stored.

9. The system of claim 5, wherein the first data is image data including multiple images, the second data is feature data representing the multiple images, and the software component is configured to extract the feature data from the image data.

10. The system of claim 5, wherein the first data is text data, the second data is feature data, and the software component is configured to extract the feature data from the text data.

11. The system of claim 5, wherein the software component is a first software component and the service is a first service, the operations further comprising:
storing a first association between the first software component and the first service of a group of services provided by the service provider network; and
storing a second association between a second software component of the group of software components and a second service of the group of services,
wherein selecting the first software component includes identifying the first association with the first service for which the model is requested to be trained.

12. The system of claim 5, wherein the software component is a first software component, the operations further comprising:
determining that a second software component of the group of software components is to be utilized in addition to the first software component to process the first data to generate the second data; and
sending the second software component to the user computing network,
wherein a particular user device in the user computing network is executing a connector component configured to execute the first software component and the second software component.

13. The system of claim 5, the operations further comprising providing the model to the service such that the model is accessible by the service to process third data sent from a user device associated with the user computing network.

14. A method comprising:
determining that a user account is registered for use of a service of a service provider network;
selecting, from a group of software components, a software component associated with the service, the software component configured to process first data in a first format to generate second data in a second format that is usable to train a model used by the service;
sending the software component to a user computing network in which the first data is stored;
receiving the second data from the user computing network; and
using the second data to train the model.

15. The method of claim 14, further comprising sending, to the user computing network, a connector component configured to execute each software component in the group of software components.

16. The method of claim 14, wherein the software component is a first software component and the service is a first service, further comprising:
storing a first association between the first software component and the first service of a group of services provided by the service provider network;
storing a second association between a second software component of the group of software components and a second service of the group of services,
wherein selecting the first software component includes identifying the first association with the first service for which the model is requested to be trained.

17. The method of claim 14, wherein the first data is image data including multiple images, the second data is feature data representing the multiple images, and the software component is configured to extract the feature data from the image data.

18. The method of claim 14, wherein the software component is a first software component, further comprising:
- determining that a second software component of the group of software components is to be utilized in addition to the first software component to process the first data to generate the second data; and
- sending the second software component to the user computing network,
- wherein a particular user device in the user computing network is executing a connector component configured to execute the first software component and the second software component.

19. The method of claim 14, wherein the first data is text data, the second data is feature data, and the software component is configured to extract the feature data from the text data.

20. The method of claim 14, further comprising receiving, from a user device associated with the user computing network, input indicating one or more computing devices in the user computing network at which the first data is stored.

\* \* \* \* \*